United States Patent [19]
Lammeck et al.

[11] Patent Number: 6,156,811
[45] Date of Patent: Dec. 5, 2000

[54] MOLDED POLYURETHANE ARTICLES PREPARED FROM RECYCLED POLYOLS AND PROCESSES FOR THEIR PRODUCTION AND USE

[75] Inventors: Adolf Lammeck, Lohmar; Werner Rasshofer, Köln, both of Germany

[73] Assignee: Bayer Aktiengesellschaft, Leverkusen, Germany

[21] Appl. No.: 09/221,387

[22] Filed: Dec. 28, 1998

Related U.S. Application Data

[62] Division of application No. 08/740,551, Oct. 30, 1996, Pat. No. 5,879,608.

[30] Foreign Application Priority Data

Nov. 3, 1995 [DE] Germany .......................... 195 10 950

[51] Int. Cl.⁷ ...................................... C08J 11/04
[52] U.S. Cl. ..................... 521/49; 521/49.5; 252/182.24; 568/700
[58] Field of Search ............... 521/49, 49.5; 252/182.24; 568/700

[56] References Cited

U.S. PATENT DOCUMENTS

5,338,763  8/1994  Munzamy et al. .
5,879,608  3/1999  Lammeck et al. .

*Primary Examiner*—John M. Cooney, Jr.
*Attorney, Agent, or Firm*—Joseph C. Gil; Lyndanne M. Whalen

[57] ABSTRACT

Molded polyurethane articles are made by reacting polyisocyanates with polyol compositions obtained by chemical decomposition of polyurethane and/or polyurea waste in a mold. The polyol compositions employed in this invention have an OH value of from about 100 to about 500 mg KOH/g, a water content of from 0 to about 5 wt. % and a viscosity at 20° C. of more than 2,000 mPa.s. These molded polyurethane articles preferably have a sandwich structure in which the core is a polyurethane and there is at least one outer layer made from an optionally fiber-reinforced plastic material. These molded polyurethane articles are useful in the motor vehicle, furniture, machine and equipment manufacturing industries.

3 Claims, No Drawings

MOLDED POLYURETHANE ARTICLES PREPARED FROM RECYCLED POLYOLS AND PROCESSES FOR THEIR PRODUCTION AND USE

This is a Divisional application of Ser. No. 08/740,551, filed Oct. 30, 1996 now U.S. Pat. No. 5,879,608.

BACKGROUND OF THE INVENTION

The present invention relates to polyurethane molded articles prepared from recycled polyols, a process for their production and their use in the motor vehicle, furniture, machine and equipment manufacturing industries.

Molded polyurethane articles are extensively used in industry, e.g., in the car manufacturing industry, in the form of polyurethane structural foams and as polyurethane sandwich components. Polyurethane molded articles are generally used in sandwich constructions when producing high-quality structural components for the motor vehicle and bodywork industry, in particular in the interior of vehicles. In principle, there are two prior art processes which are used for the production of such sandwich components.

In the "filling" process, two half-shells (outer layers) are made first. These half-shells are inserted into a mold and the cavity between the shells is filled with a polyurethane foam.

In the envelope construction process, a core made of polyurethane foam is initially introduced into a mold. This core is then covered with a suitable encasing material made of, e.g., a fiber-reinforced plastic such as an epoxy resin or an unsaturated polyester resin.

Polyol compositions recovered from polyurethane or polyurea waste have rarely been used for the production of polyurethane molded articles such as high-quality structural components for the vehicle and bodywork industry.

SUMMARY OF THE INVENTION

It is an object of the present invention to provide a process for the production of high quality molded polyurethane articles in which polyol compositions recovered from polyurethane and/or polyurea waste (PUR waste) are used.

It is also an object of the present invention to provide high quality molded polyurethane articles which are produced from polyols recovered from polyurethane and/or polyurea waste.

These and other objects which will be apparent to those skilled in the art are accomplished by molding a polyurethane-forming reaction mixture which includes a polyol composition produced by decomposition of polyurethane and/or polyurea waste which have an OH value of from about 100 to about 500 mg KOH/g, a water content of up to 5 wt. % and a viscosity greater than 2,000 mPa.s at 20° C.

DETAILED DESCRIPTION OF THE INVENTION

The present invention relates to high quality molded polyurethane articles which are obtainable by the reaction of a polyisocyanate with a polyol composition obtained by the chemical decomposition of polyurethane and/or polyurea waste in a mold. The polyol composition must have an OH value of from about 100 to 500 mg KOH/g, a water content of up to 5 wt. % and a viscosity of more than 2,000 mPa.s (20° C.).

It is surprising that high quality molded polyurethane articles can be produced using polyols satisfying these OH value, water content and viscosity requirements because, according to the prior art, polyols having much higher OH values (mostly in the range of from 300 to 1,000 mg KOH/g), and substantially lower viscosities (mostly in the range of <2,000 mPa.s (20° C.)) should be used to produce such articles.

The OH value, water content and viscosity requirements for the polyols of the present invention are achieved by adjusting the properties of the recycled polyols recovered from polyurethane and/or polyurea waste by chemical decomposition using additives which are described in more detail below.

The molded polyurethane articles of the present invention preferably have a density of from about 50 to about 1500 kg/m$^3$.

The molded polyurethane articles of the present invention may be either expanded or solid molded articles but are preferably expanded molded articles.

Particularly preferred molded polyurethane articles of the present invention are composite articles which contain, in addition to a polyurethane core based on recycled polyols in a sandwich construction, at least one additional, outer layer made of a plastic material. Epoxy resins and unsaturated polyester resins are particularly preferred plastic materials which have been found to be useful as outer layers. The outer layer is most preferably a fiber-reinforced plastic material. Bonded fiber materials suitable for this purpose include any of the known fibrous reinforcing substances such as natural fibers, glass fibers, carbon fibers, other polymeric fibers in the form of matted fibers, knitted fabrics and woven fabrics. These fibrous materials may be reinforced, e.g., by epoxy, unsaturated polyester, polyurethane, melamine, vinyl resins and also by thermoplastic powders. These binders may be applied and incorporated by spraying, rolling, spreading and pouring and, in the case of PUR resins, may also contain recycled PUR material.

The molded polyurethane articles of the present invention are readily formed as layered composite articles in a sandwich construction having an outer or encasing layer A composed of fiber-reinforced plastic material, a core layer B composed of a polyurethane foam based on recycled polyols and, if required, another layer which is either the same as layer A or composed of a different material. Decorative materials such as films, molded skins, textiles or carpeting, may be impressed directly onto the external surfaces of the outer layers in known manner (e.g., direct lamination). In the case of multi-layered sandwich structures, additional, different layers of different materials may optionally also be used.

The present invention also relates to polyol compositions which are used to prepare molded polyurethane articles. These polyol compositions are obtained by chemical decomposition of polyurethane and/or polyurea waste and have an OH value of from about 100 to about 500, preferably from about 200 to about 450, most preferably from about 250 to about 400 mg KOH/g. These polyol compositions also have a water content of from 0 to about 5 wt. %, preferably from about 0.2 to about 2 wt. %, most preferably from about 0.5 to about 1 wt. %. These polyols have a viscosity of more than 2,000 mPa.s (20° C.), preferably from about 3,000 to about 20,000 mPa.s (20° C.), most preferably from about 5,000 to about 10,000 mPa.s (20° C.).

The polyurethane and/or polyurea waste from which the polyol compounds used in the practice of the present invention are produced may be any of the conventional reaction products of an isocyanate and one or more of the conventional diols and/or polyols, e.g., polyesters or polyethers.

The present invention also relates to a process for preparing molded polyurethane articles by reacting polyisocyanates with polyols satisfying specified criteria and optionally other auxiliary agents and additives. The polyol compositions required in this process: (1) must be obtained by chemical decomposition of polyurethane and/or polyurea waste; (2) must have an OH value of from about 100 to about 500, preferably from about 200 to about 450, most preferably from about 250 to about 400 mg KOH/g; (3) must have a water content of from 0 to about 5 wt. %, preferably from about 0.2 to about 2 wt. %, most preferably from about 0.5 to 1 wt. %; and (4) must have a viscosity at 20° C. of more than 2,000 mPa.s, preferably from about 3,000 to about 20,000 mPa.s, most preferably from about 5,000 to about 10,000 mPa.s.

Expanded or solid molded articles, preferably molded articles with a sandwich construction, may be produced by the process of the present invention.

In the process of the present invention, any of the known auxiliary agents and additives such as mold release agents, blowing agents, fillers, catalysts and flame retardants may be used.

When expanded molded articles are produced, the reaction mixture may be introduced into the mold in any known manner. The expandable reaction mixture expands in the mold and forms the molded article. Expansion to fill the mold may be carried out in such a way that the molded article has a cellular structure at the surface. Expansion may also be conducted in a way such that the molded article has a compact skin and a cellular core (structural foam).

The process of the present invention for producing polyurethane composite articles in a sandwich construction may be carried out either by a filling or by an envelope construction process. Both filling and envelope construction processes are known to those skilled in the art.

In the "filling" construction process, two half-shells (e.g., outer layers made of fiber-reinforced plastic material) are first produced. These half-shells are then introduced into a mold and the cavity between the shells is filled with expanded PUR foam. In the envelope construction process, a core of PUR foam produced in accordance with the present invention is initially introduced into a mold. This core is then encased with a suitable material such as a fiber-reinforced epoxy resin or an unsaturated polyester resin. The envelope construction process is preferred.

In a specially advantageous embodiment of the present invention, composite articles having expanded PUR cores are produced by the envelope construction method using recycled polyol compounds. Any of the known conventional blowing agents and auxiliary agents such as mold release agents, may be used. If no external mold release agent is used, a particularly powerful bond is formed between the polyurethane core and the encasing material and there is no need for any secondary finishing or preparation of the encasing and/or core layer. Any of the known fiber-reinforced plastic materials may be used as the encasing layer.

The polyols useful in the practice of the present invention may be obtained by chemical decomposition of any polyurethane and/or polyurea waste and also from polyurethane or polyurea composites. Composites from which these polyols may be obtained include materials made of polyurethane and another material such as a thermoplastic material from which the non-polyurethane material is largely separated before the polyurethane recycling procedure is begun. Examples of such composites include vehicle control panels made from a glass matting reinforced polyurethane support with a soft polyurethane foam as the backing material or an aliphatic polyurethane skin as a decorative and covering layer.

Processes for the chemical decomposition of polyurethane and/or polyurea waste to give polyol compounds are known. Examples of such processes are aminolysis, alcoholysis and glycolysis procedures. Specific details with respect to these known processes are described in detail in the prior art (e.g., in W. Raßhofer, *Recycling von Polyurethan-Kunststoffen*, Hüthig-Verlag, Heidelberg, 1994).

The polyol compounds are preferably obtained from polyurethane and/or polyurea waste by glycolysis of that waste in known manner. In such processes, coarsely milled or finely crushed polyurethane and/or polyurea waste is reacted at 160 to 240° C. with a glycol, preferably diethylene glycol, in a ratio by weight of waste:glycol of from 10:1 to 1:2, preferably from 5:1 to 1:1. After being stirred for about 0.5 to 10 hours, a liquid product is obtained. The polyol obtained has the following characteristics: OH value of from about 20 to about 1,070 mg KOH/g, water content of from 0 to about 5 wt. %, and a viscosity at 20° C. greater than 2,000 mPa.s. When the OH value is very high, the viscosity may also be less than 2,000 mPa.s (20° C.).

The properties of polyol compositions obtained from chemical decomposition of polyurethane and/or polyurea waste do not generally have the characteristics required for industrial production of polyurethane molded articles in accordance with the present invention. The polyol composition characteristics may, however, be adjusted with additives. Known additives such as cross-linking agents, foam stabilizers, flow promoters, mold release agents, catalysts, blowing agents, etc. and mixtures thereof are generally used for this purpose. The additive or additives are generally used in amounts such that the total weight of the additives with respect to the total weight of the polyol composition included in the polyurethane/polyurea-forming mixture is from about 2 to 50 wt. %. The additives and additive mixtures used to adjust the polyol characteristics generally have OH values of from about 300 to about 1,050 mg KOH/g, viscosities of from about 100 to about 5,000 mPa.s, water contents of from 0 to about 10 wt. % and acid values of from 0 to about 100 mg KOH/g.

It is surprising that formulated polyols satisfying the OH value, water content and viscosity requirements of the present invention obtained by chemical decomposition of polyurethane and/or polyurea waste are suitable at all for the production of high quality polyurethane molded articles, particularly, polyurethane molded articles with a sandwich structure because when such molded articles are produced from new (i.e., not obtained by chemical decomposition of waste) polyols, substantially higher OH values (i.e., more than 500 to 1,000 mg KOH/g) are required. It is also surprising because the viscosities of polyols used in prior art processes are generally substantially lower than 2,000 mPa.s (20° C.). The fact that polyols obtained from polyurethane and/or polyurea waste could nevertheless be processed to give high quality polyurethane molded articles, despite their much higher viscosity and their lower activity (due to their lower OH value) was not expected.

The process for molding polyurethane articles of the present invention makes it possible to produce high quality structural components for a wide range of applications. The present invention thus permits the use of recycled raw materials from waste materials to produce structural components without sacrificing mechanical properties.

The polyols obtained from chemical decomposition of polyurethane and/or polyurea waste may be reacted with any of the known polyisocyanates. Suitable polyisocyanates include aliphatic, cycloaliphatic, araliphatic, aromatic and heterocyclic polyisocyanates such as those described by W. Siefgen in *Justus Liebigs Annalen der Chemie*, 362, pages 75 to 136. Examples of suitable polyisocyanates include those corresponding to the general formula $$Q(NCO)_n$$

in which n is 2 to 5, preferably 2 to 3, and

Q represents an aliphatic hydrocarbon group with 2 to 18 (preferably 6 to 10) carbon atoms, a cycloaliphatic hydrocarbon group with 4 to 15 (preferably 5 to 10) carbon atoms, or an aromatic hydrocarbon group with 6 to 15 (preferably 6 to 13) carbon atoms.

Such polyisocyanates are described in German Offenlegungsschrift 2,832,253, pages 10 to 11.

Generally, those polyisocyanates which are commercially available are preferably used in the practice of the present invention. Examples of these polyisocyanates include: 2,4 and 2,6-toluene diisocyanate, and any mixture of these isomers ("TDI"); diphenylmethane diisocyanate ("MDI") and polyphenylpolymethylene polyisocyanates such as those prepared by aniline/formaldehyde condensation and subsequent phosgenation; and polyisocyanates with carbodiimide, urethane, allophanate, isocyanurate, urea or biuret groups ("modified polyisocyanates"), particularly those modified polyisocyanates which are derived from 2,4 and/or 2,6-toluene diisocyanate or 4,4' and/or 2,4'-diphenylmethane diisocyanate.

The molded polyurethane articles of the present invention are useful in the motor vehicle, furniture, machine and equipment manufacturing industries. Polyurethane molded articles having a sandwich structure are preferably used in the motor vehicle construction industry, particularly in the interiors of motor vehicles. In addition to low weight and high strength, sandwich-structured components according to the invention are characterized by a particularly low concentration of emittable and extractable substances due to the use of polyurethane materials as the core and outer layer matrix binding materials. In the motor vehicle field, the molded articles of the present invention may be used as 2 and/or 3-dimensional molded articles such as cladding components or coverings which can be laminated, internal cladding for doors, control panel supports, dashboard supports, air flow ducts, cable covers, cable ducts and boot linings. These molded articles may also be processed to produce housings and housing covers, pallets, low-load supports, coverings, vertical and horizontal structural components, bulkhead walls, built-in shelves, etc. In the furniture field, the molded polyurethane articles of the present invention may be used as substitutes for tropical wood, particularly in the form of imitation plywood.

The following examples are intended to illustrate the invention without, however, restricting its scope.

EXAMPLES

Example 1
(Chemical decomposition of polyurethane waste by means of glycolysis)

A granular material with a particle size of 8 mm made from glass fiber reinforced polyurethane urea with a density of 1.26 g/cm³ was subjected to glycolysis. More specifically, 4 kg of diethylene glycol were initially introduced into a 20 l flask fitted with a stirrer and a heating jacket, covered with a layer of nitrogen and preheated to 220° C. 8 kg of polyurethane urea granules were added to the hot mixture in portions while maintaining the presence of a nitrogen atmosphere. Addition of the polyurethane urea was gauged so that the mixture was stirrable at all times. After complete addition of the granules, stirring was continued for 90 minutes at 200 to 210° C. The mixture was then cooled to 160° C., 0.2 kg of ethyl acetoacetate were mixed in and stirring was continued for one hour at this temperature. A liquid product of recycled polyols, which separated into 2 phases on standing, with the following properties was obtained:

OH value=353 mg KOH/g

NH value=33 mg KOH/g

Acid value=0.07 mg KOH/g

Viscosity=approximately 20,000 mPa.s (20° C.)

Example 2
(Production of a polyurethane molded article in accordance with the present invention)

The recycled polyol glycolyzate obtained by glycolysis in Example 1 was mixed with an additive mixture which had the following properties:

OH value=400 mg KOH/g

Water content=2.6 wt. %

Viscosity=1,500 mPa.s (20° C.)

in an amount of 25 wt. % with respect to the total amount of polyol. A polyol composition with the following properties was obtained:

OH value=approximately 380 mg KOH/g

Water content=approximately 1 wt. %

Viscosity=approximately 3,500 mPa.s

The above-described polyol formulation was reacted with crude MDI (polyisocyanate) using a known reaction injection molding method to produce an expanded molded polyurethane article. An external mold release agent was not used. A molded polyurethane article having a density of 400 kg/M³ was obtained.

Example 3
(Production of a molded polyurethane article having a sandwich construction in accordance with the present invention)

Example 3a

Coconut fiber matting with a weight per unit area of 600 g/m² was coated by impregnating and spraying in known manner with a polyurethane polyurea matrix material (commercially available under the name Baypreg® from Bayer AG), outside the mold. The outer layer obtained in this way was used to produce a polyurethane molded article having a sandwich structure in accordance with the present invention.

A mold (steel, 120° C., 300×300×8 mm) was filled with an outer layer which had been produced as described above, a polyurethane core corresponding to that produced in Example 2, and an additional outer layer having the same composition as the first outer layer. The mold was then sealed. After 2 minutes at 120° C. and a pressure of 50 bar, a powerfully bonded article having a sandwich construction was removed from the mold.

Example 3b

The procedure of Example 3a) was repeated using the same materials and conditions with the exception that an additional decorative film made of PVC/ABS was laid onto one of the outer layers used before the mold was sealed. After 2 minutes at 120° C. and a pressure of 50 bar, a powerfully bonded article having a sandwich construction with an additional decorative layer was removed from the mold.

Example 3c

The procedure of Example 3a) was repeated with the exception that instead of an outer layer reinforced with coconut fiber matting, outer layers which had been prepared with glass fiber matting having a weight per unit area of 450 g/m² were used. Each of the molded articles having a sandwich structure prepared in accordance with the invention demonstrated a very powerful bond between the core and the casing material as well as good heat resistance and strength.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyol composition having an OH value of from about 100 to about 500 mg KOH/g, a water content of up to 5 wt. % and a viscosity greater than 2,000 mPa.s at 20° C. which is obtained by chemical decomposition of polyurethane waste and/or polyurea waste and addition of any additive necessary to adjust the OH value, water content or viscosity to the required level for industrial production of polyurethane molded articles.

2. The polyol composition of claim 1 having an OH value of from about 200 to about 450 mg KOH/g, a water content of from about 0.2 to about 2 wt. % and a viscosity of from about 3,000 to about 20,000 mPa.s at 20° C.

3. The polyol composition of claim 1 having an OH value of from about 250 to about 400 mg KOH/g, a water content of from about 0.5 to about 1.0 wt. % and a viscosity of from about 5,000 to about 10,000 mPa.s at 20° C.

\* \* \* \* \*